(12) United States Patent
Lewis

(10) Patent No.: US 7,633,915 B1
(45) Date of Patent: Dec. 15, 2009

(54) USE OF POSITIONING INFORMATION TO DETERMINE WHETHER TO TRIGGER A PACKET-DATA-NETWORK RE-REGISTRATION WHEN DETECTING MULTIPLE RADIO SIGNALS OF SUFFICIENT STRENGTH

(75) Inventor: Ronald E. Lewis, Independence, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 201 days.

(21) Appl. No.: 11/224,527

(22) Filed: Sep. 12, 2005

(51) Int. Cl.
*H04J 3/22* (2006.01)

(52) U.S. Cl. ........................ 370/338; 370/331; 370/332; 455/435.1; 455/436; 455/437; 455/440; 455/442

(58) Field of Classification Search .............. 455/435.3, 455/435.2, 437, 440, 442, 443, 432.1, 435.1; 370/338, 328, 331, 332
See application file for complete search history.

(56) References Cited

U.S. PATENT DOCUMENTS

| | | | |
|---|---|---|---|
| 6,330,446 B1 | 12/2001 | Mori | |
| 6,385,460 B1 | 5/2002 | Wan | |
| 6,526,286 B2 | 2/2003 | Wan | |
| 6,631,263 B1 * | 10/2003 | Corkery | 455/436 |
| 6,879,600 B1 * | 4/2005 | Jones et al. | 370/466 |
| 6,993,335 B2 * | 1/2006 | Natarajan et al. | 455/437 |
| 7,062,271 B2 * | 6/2006 | Choi | 455/434 |
| 7,065,063 B2 * | 6/2006 | Tran | 370/332 |
| 7,260,399 B1 * | 8/2007 | Oh et al. | 455/436 |
| 2002/0061751 A1 * | 5/2002 | Zhao | 455/442 |
| 2003/0148765 A1 * | 8/2003 | Ma et al. | 455/438 |
| 2004/0097234 A1 * | 5/2004 | Rajkotia et al. | 455/442 |
| 2005/0070281 A1 * | 3/2005 | Rajkotia et al. | 455/435.1 |
| 2005/0111409 A1 * | 5/2005 | Spear et al. | 370/331 |
| 2005/0128969 A1 * | 6/2005 | Lee et al. | 370/313 |
| 2005/0136925 A1 * | 6/2005 | Yamauchi | 455/435.1 |
| 2007/0026866 A1 * | 2/2007 | Krishnamurthi et al. | 455/440 |

OTHER PUBLICATIONS

U.S. Appl. No. 10/629,406, filed Jul. 29, 2003, Method and System for Determining Availability of a Radio Network.
Saleh, "A Location-aided Decision Algorithm for Handoff Across Heterogeneous Wireless Overlay Networks," Jul. 8, 2004.
Unpublished U.S. Appl. No. 11/265,405, filed Nov. 1, 2005 in the name of Jason P. Sigg.

* cited by examiner

*Primary Examiner*—George Eng
*Assistant Examiner*—Brandon J Miller

(57) ABSTRACT

Methods and systems are provided for use of positioning information to determine whether to trigger a packet-data-network re-registration when detecting multiple radio signals of sufficient strength. A mobile node registers with a first mobility agent, wherein the mobile node communicates with the first mobility agent via a first radio transceiver. The mobile node determines that a first signal strength of a first radio signal from the first radio transceiver and a second signal strength of a second radio signal from a second radio transceiver are each greater than a first threshold and that the second signal strength is greater than the first signal strength, and responsively determines whether or not it is traveling. If the mobile node determines that it is traveling, the mobile node registers with a second mobility agent, wherein the mobile node communicates with the second mobility agent via the second radio transceiver.

20 Claims, 3 Drawing Sheets

US 7,633,915 B1

USE OF POSITIONING INFORMATION TO DETERMINE WHETHER TO TRIGGER A PACKET-DATA-NETWORK RE-REGISTRATION WHEN DETECTING MULTIPLE RADIO SIGNALS OF SUFFICIENT STRENGTH

BACKGROUND

1. Technical Field

The present invention relates to wireless communications and, more particularly, to mobility of wireless packet-data-communication devices.

2. Description of Related Art

More people than ever are using mobile nodes, such as cellular telephones and personal digital assistants, to engage in wireless communications. In addition to using these mobile nodes for voice communication, people are using them to engage in packet-data communication via wireless networks, such as wireless wide area networks (WWANs) and wireless local area networks (WLANs). As examples, this packet-data communication may involve e-mail, web browsing, receipt of streaming media, voice-over-Internet Protocol (VoIP) sessions, video sessions, instant messaging sessions, and other data services via these wireless networks.

Some of these data sessions, such as VoIP sessions for example, may be set up using the Session Initiation Protocol (SIP) and conducted using the real-time transport protocol (RTP), relevant aspects of which are described in "SIP: Session Initiation Protocol," RFC 3261 (June 2002) and "RTP: A Transport Protocol for Real-Time Applications," RFC 1889 (January 1996), respectively, which are incorporated herein by reference. In addition to these protocols, mobile nodes may use other signaling and bearer protocols, and other communication protocols.

As indicated by the term mobile node, these devices are mobile, typically designed to maintain or frequently re-establish packet-data connectivity with a network device via a nearby radio transceiver, such as may be found in a WWAN base station or a WLAN access point. Such a device may provide an interface for the mobile node between the transceiver and a packet-data network, and may be referred to as a mobility agent, though other names may be used as well, such as gateway, packet data serving node (PDSN), or network access server (NAS).

Furthermore, it is often the case that different radio transceivers are associated with different mobility agents, though each mobility agent may provide connectivity with the same packet-data network (perhaps via one or more additional networks). As a result, when a mobile node moves from communicating with a first radio transceiver to communicating with a second radio transceiver, the mobile node may also be required to switch from accessing the packet-data network via a first mobility agent associated with the first radio transceiver to accessing the packet-data network via a second mobility agent associated with the second radio transceiver.

This move by the mobile node from communicating with the first radio transceiver to communicating with the second radio transceiver, and thus from communicating with the first mobility agent to communicating with the second mobility agent, typically involves the mobile node switching from using a first network address, such as a first Internet Protocol (IP) address, assigned to the mobile node by or via the first mobility agent, to using a second network address, assigned to the mobile node by or via the second mobility agent.

This transition may be handled in several different ways. One way is by using IP, which may also be known as Simple IP, relevant aspects of which are described in "Internet Protocol," RFC 791 (September 1981), which is incorporated herein by reference. In this case, the mobile node, upon transitioning to communication with the second mobility agent, would request an IP address from or via that mobility agent, perhaps using the Dynamic Host Configuration Protocol (DHCP), relevant aspects of which are described in "Dynamic Host Configuration Protocol," RFC 2131 (March 1997) and "Dynamic Host Configuration Protocol for IPv6 (DHCPv6)," RFC 3315 (July 2003), which are incorporated herein by reference. The mobile node may then use that address for packet-data communication.

In this scenario, the mobile node would likely not be able to keep a communication session active when switching to the second mobility agent, since other nodes on the packet-data network would not yet know the mobile node's second IP address. Along those lines, the mobile node would need to re-register the new address with any entity maintaining contact information for the mobile node, such as a SIP proxy. In the context of a wireless network implementing simple IP, handoffs from one mobility agent to another can thus be costly in terms of communication disruption, not to mention battery power needed to effect the transition.

In order to address certain limitations of Simple IP, including the communication disruption described above, and to handle the mobility of packet-data-communication devices generally, a protocol known as Mobile IP has been and is still being developed, relevant aspects of which are described in "IP Mobility Support for IPv4," RFC 3344 (August 2002) and "Mobility Support in IPv6," RFC 3775 (June 2004), which are incorporated herein by reference.

In Mobile IP, mobile nodes are able to maintain a semi-permanent IP address, called a home address, to which other nodes on the Internet may transmit packets regardless of the mobile node's current point of attachment to the Internet. Furthermore, mobile nodes have a home network, on which resides a mobility agent known—with respect to the mobile node—as a home agent. When packets are transmitted to a mobile node's home address, those packets will be routed by normal IP routing mechanisms to the mobile node's home network.

When the mobile node is attached to its home network, it will receive these packets as any IP node would. When the home agent is attached to another network, known—again with respect to the mobile node—as a foreign network, the home agent will intercept these packets on the home network and forward them to an address which the mobile node has registered with the home agent. This address is known as a care-of address, and may be an IP address assigned to the mobile node on the foreign network, or it may be an IP address of a mobility agent on that foreign network, known—with respect to the mobile node—as a foreign agent, which would then forward the packets to the mobile node.

In a Mobile IP scenario, then, a mobile node may maintain connectivity using its home address, whether involved at the time in a communication session or not, either by connecting to its home network, or by conducting Mobile IP registrations and re-registrations, updating its home agent with the IP address of the particular foreign agent with which the mobile node is connected at that time. Whether a particular wireless network implements Simple IP, Mobile IP, or some combination thereof, and whether that network implements IPv4, IPv6, or some combination thereof, it may be the case that mobile nodes are programmed to conduct registrations or re-registrations with whichever mobility agent is associated with the radio transceiver from which the mobile node is currently receiving the strongest radio signal.

In Simple IP, or in Mobile IP when the mobile node is connected to its home network, these registrations may simply take the form of the mobile node establishing a link-layer connection with a mobility agent and then requesting an IP address using a protocol such as DHCP. In Mobile IP, when the mobile node is connected to a foreign network, these registrations may take the form of the mobile node establishing a link-layer connection with the mobility agent (i.e., the foreign agent) and then exchanging registration request and reply messages via that mobility agent with the mobile node's home agent, to register the mobility agent's IP address as the care-of address for the mobile node.

Whether Simple IP, Mobile IP, or another protocol is implemented in a wireless network, there are undesirable consequences when a mobile node conducts frequent registrations and re-registrations. Some of these consequences include draining the mobile node's supply of battery power, lowering the quality of service that a user of the mobile node experiences, consuming network resources, and potentially blocking circuit-switched voice calls while the mobile node repeatedly makes "data calls" to conduct the re-registrations. And there may be other undesirable consequences as well.

Frequent registrations and re-registrations may occur when a mobile node is located on or near a boundary between the coverage areas of two radio transceivers, where each radio transceiver is associated with a different mobility agent, or in an area of overlap between two such coverage areas; in that situation, the respective radio signals that the mobile node may be receiving from the radio transceivers may each be sufficiently strong to support packet-data communication, though one radio signal may be slightly stronger than the other.

Furthermore, even while relatively stationary, the mobile node may observe frequently-changing strength of signals from the two radio transceivers due to atmospheric conditions, physical obstructions, terrain, or other reasons. Thus, even though the signals may each be strong enough to support packet-data communication, the particular signal that is the strongest at any given moment may change repeatedly during a particular time period.

In these situations, a mobile node programmed to conduct a registration or re-registration with the mobility agent associated with the radio transceiver from which the mobile node is currently receiving the strongest signal may repeatedly conduct registrations and re-registrations back and forth between the mobility agents respectively associated with these radio transceivers, in order to maintain VoIP and other packet-data services. Thus, the undesirable consequences described above, and perhaps other undesirable consequences, may occur unnecessarily, as the signals from both transceivers are each sufficient to support packet-data communication.

SUMMARY

Methods and systems are provided for the use of positioning information to determine whether to trigger a packet-data network re-registration when detecting multiple radio signals of sufficient strength. A mobile node may register with a first mobility agent associated with a first radio transceiver, and thereafter detect receipt of a radio signal from a second radio transceiver associated with a second mobility agent. The mobile node may further determine (i) that the radio signals from the first and second radio transceivers are each strong enough to support packet-data communication and (ii) that the radio signal from the second radio transceiver is stronger than the radio signal from the first radio transceiver.

Rather than automatically re-register with the second mobility agent due to the radio signal from the second radio transceiver being stronger than the radio signal from the first base station, the mobile node will first determine whether or not it is traveling. If the mobile node is traveling, it will re-register with the second mobility agent via the second radio transceiver. If not, the mobile node will not re-register with the second mobility agent; rather, the mobile node will remain registered with the first mobility agent for the time being.

The mobile node may determine whether or not it is traveling by using a positioning technology (e.g., Global Positioning System (GPS)) and comparing the most recent measurement of the mobile node's position to a previous measurement. In this manner, the mobile node avoids re-registering with the second mobility agent in cases where the mobile node is not traveling and is already receiving a radio signal sufficient to support packet-data communication.

In making the determination as to whether or not it is traveling, in addition to positioning data, the mobile node may also consider a change in signal strength from either the first or second radio transceiver. If the signal strength of the first transceiver has decreased a certain amount, or if the signal strength of the second transceiver has increased a certain amount, this may reinforce the mobile node's determination that it is traveling.

Thus, an exemplary embodiment of the present invention may take the form of a method. In accordance with the method, a mobile node registers with a first mobility agent, wherein the mobile node communicates with the first mobility agent via a first radio transceiver. The mobile node determines that a first signal strength of a first radio signal from the first radio transceiver and a second signal strength of a second radio signal from a second radio transceiver are each greater than a first threshold and that the second signal strength is greater than the first signal strength, and responsively determines whether or not it is traveling. If the mobile node determines that it is traveling, the mobile node registers with a second mobility agent, wherein the mobile node communicates with the second mobility agent via the second radio transceiver.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
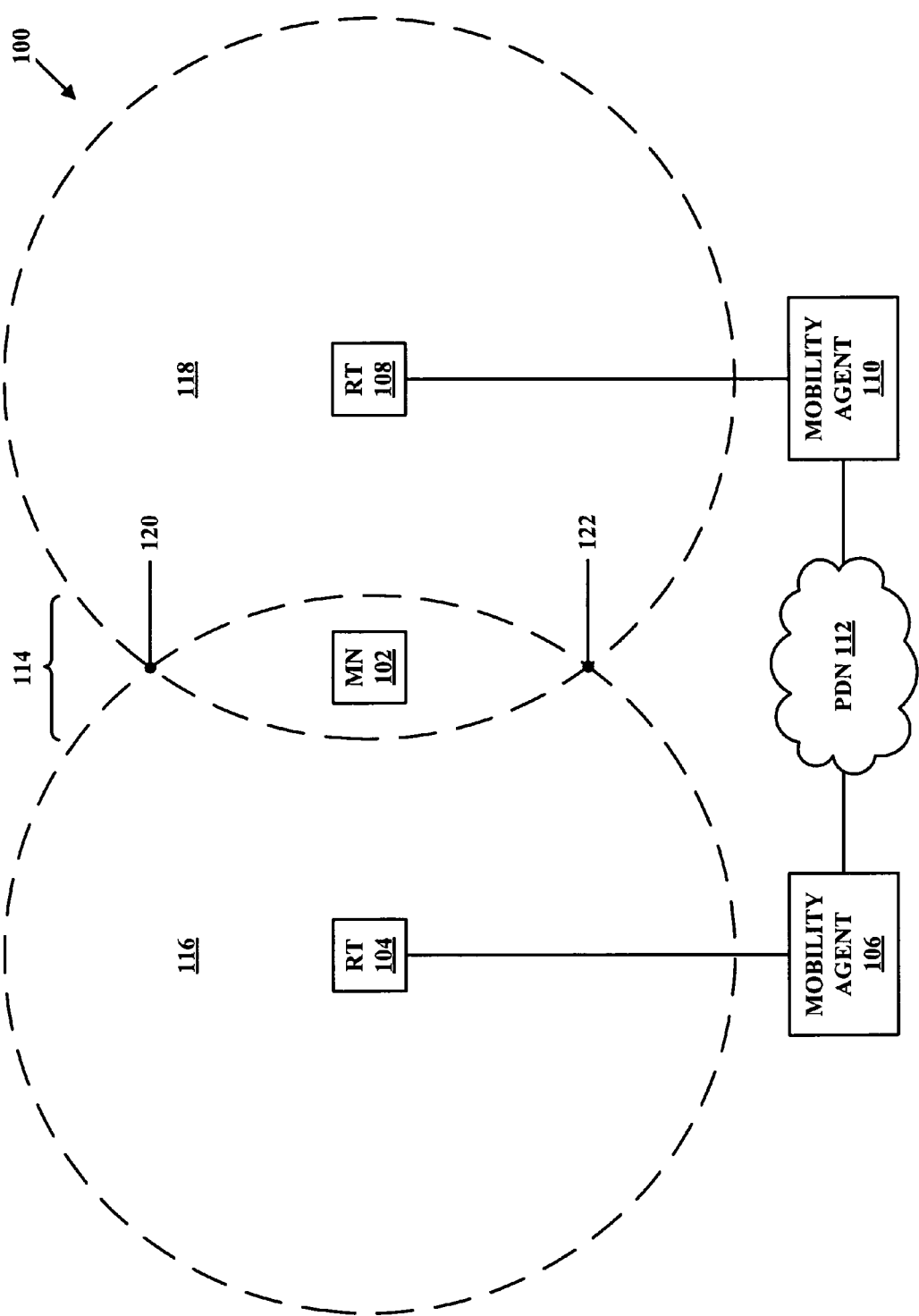
FIG. 1 is a simplified block diagram of a communication system, in accordance with an exemplary embodiment.

In accordance with an exemplary embodiment, a mobile node will register with a first mobility agent, which may implement Simple IP, or may be a Mobile IP home agent or foreign agent with respect to the mobile node. If the first mobility agent implements Simple IP or is a home agent, then this registration may simply take the form of the mobile node connecting to the mobility agent and perhaps acquiring a first IP address. If the first mobility agent is a foreign agent with respect to the mobile node, however, the mobile node may transmit a registration request via the first mobility agent to the mobile node's home agent, establishing the first mobility agent's IP address as the mobile node's care-of address, which the home agent will then use to tunnel packet-data intended for the mobile node to the first mobility agent. In either case, the mobile node communicates with the first mobility agent in part via wireless communication with a first radio transceiver associated with the first mobility agent. As examples, the first radio transceiver could be a WWAN base station or a WLAN access point.

The mobile node may then move into an area of overlap between the coverage areas of the first radio transceiver and a second radio transceiver. The second radio transceiver may be associated with a second mobility agent, which also may implement Simple IP, or be either a home agent or a foreign agent with respect to the mobile node. The mobile node may detect messages known as agent advertisements from the second mobility agent via the second radio transceiver; alternatively, the mobile node may send solicitation messages to aid in discovering the second mobility agent.

Either way, the mobile node now has the option of remaining registered with the first mobility agent or re-registering with the second mobility agent. If the second mobility agent implements Simple IP or is the mobile node's home agent, this may simply mean connecting to the second mobility agent, perhaps via the mobile node's home network, and acquiring a second IP address; if, however, the second mobility agent is a Mobile IP foreign agent with respect to the mobile node, this may mean sending a registration request to the mobile node's home agent, to establish the second mobility agent's IP address as the mobile node's care-of address.

The mobile node may then measure the strength of the respective radio signals received from the first and second radio transceivers. If the mobile node detects that the signal from the first radio transceiver is stronger than the signal from the second radio transceiver, the mobile node may remain registered with the first mobility agent. The mobile node may, however, detect that the signal from the second transceiver is stronger than the signal from the first transceiver.

In this situation, the mobile node may compare the strength of both signals to what has been programmed into the mobile node as an acceptable (or desirable) minimum threshold of signal strength. If, between the two signals, only the signal from the second transceiver is above this threshold, the mobile node may re-register with the second mobility agent via the second transceiver. This may correspond to the mobile node having moved quickly from the coverage area of the first transceiver into the coverage area of the second transceiver.

If however, both the radio signal from the first transceiver and the radio signal from the second transceiver are above the threshold value, the mobile node may then turn to positioning data to aid in making the decision as to whether or not to re-register with the second mobility agent. The mobile node may make a determination as to whether or not it is traveling: if it is, it may re-register with the second mobility agent; if not, it may not.

This logic is based on the idea that, if a mobile node is currently receiving two signals that are both strong enough to support packet-data communication, the mobile node should only incur the costs (battery drain, possibly blocking voice calls, etc.) associated with a re-registration if the mobile node is currently traveling, which indicates that it is likely that the mobile node is currently moving from the coverage area of the first transceiver into the coverage area of the second transceiver and may soon be receiving a signal only from the second transceiver.

The mobile node may make the determination as to whether or not it is traveling by comparing its current (or most-recently-obtained) position with a previous position, to determine whether the distance between those two measurements is greater than (or greater than or equal to) a particular threshold, perhaps 250 feet or 500 feet. One possible approximate value for the threshold could be the typical overlap between cells in the WWAN. The mobile node may obtain a measurement of its current position through the use of GPS, or another method.

The previous position could be the second-most-recently-obtained position. That is, the mobile node may be programmed to periodically (such as every 10 seconds or every 30 seconds, as examples) take a measurement of its position. The mobile node may then, at all times, store its two most recent position measurements. By comparing these two values, the mobile node may make a determination as to whether or not it is traveling.

Alternatively, the previous-position value could be the first position obtained by the mobile node once it determined that it was receiving at least two radio signals (from two different radio transceivers, each associated with a different mobility agent) that were each sufficient to support packet-data communication. That is, the mobile node, upon detecting these multiple signals, could store an initial position. The mobile node may then periodically compare its current position to that initial position, to determine whether or not the mobile node is traveling, or staying within a certain radius of the initial position.

The mobile node may also use specific measurements of the signal strengths from the first or second radio transceiver as part of the determination as to whether the mobile node is traveling and should therefore register with the second mobility agent. The mobile node may compare a recent measurement of signal strength from the first radio transceiver with an earlier measurement, to determine whether the mobile node is now receiving a weaker signal than before, indicating that the mobile node is moving away from the first transceiver. The mobile node may instead determine whether the signal from the second transceiver has gotten stronger since an earlier measurement. This signal-strength consideration may augment the consideration of positioning data, and assist the mobile node in avoiding unnecessary handoffs in cases where the path along which the mobile node is moving is such that the signal strengths from the first and second transceivers are remaining relatively constant.

2. Exemplary Architecture a. Exemplary Communication System

FIG. 1 is a simplified block diagram of a communication system, in accordance with an exemplary embodiment. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes a mobile node 102, a radio transceiver 104, a mobility agent 106, a radio transceiver 108, a mobility agent 110, and a packet-data network (PDN) 112. Furthermore, FIG. 1 depicts radio transceiver 104 as having a coverage area 116 and radio transceiver 108 having a coverage area 118. Mobile node 102 is depicted as being located in an area of overlap of the coverage areas 116 and 118, where this overlap has a maximum width 114.

It should be understood that any number of additional network entities could be present in FIG. 1 as well. For example, there could be any number of mobile nodes and other devices in communication with radio transceiver 104, mobility agent 106, radio transceiver 108, mobility agent 110, and PDN 112. Furthermore, there could be any number of intermediate devices and networks making up all or part of any of the communication links shown in FIG. 1. For example, there could be one or more routers, wireless networks, or other devices on the communication link between mobility agent 106 and PDN 112.

Furthermore, it is not necessary that the coverage areas 116 and 118 take on a similar shape, that they take on a circular shape, or that the depicted area of overlap between the two coverage areas take on any particular shape. Other network arrangements are possible. For example, more than two radio transceivers could be present, perhaps each being associated with a different mobility agent. Additionally, one or more of these additional radio transceivers could be associated with one mobility agent, while another group of radio transceivers could be associated with another mobility agent. The arrangement of FIG. 1 is only as an example.

In general, mobile node 102 may be any mobile device capable of communicating wirelessly with one or more radio transceivers, such as radio transceivers 104 and 108, and of carrying out the functions described herein. As examples, mobile node 102 may be—or include one or more of the functions of—a cellular telephone, a voice-over-packet telephone, a laptop computer, a personal digital assistant, and/or a multi-mode device, capable of communicating with one or more WWANs and one or more wireless local area networks (WLANs).

Mobile node 102 may communicate with radio transceivers 104 and 108 using one or more Code Division Multiple Access (CDMA) protocols, one or more Time Division Multiple Access (TDMA) protocols, Advanced Mobile Phone Service (AMPS), Global System for Mobile Communications (GSM), one or more Orthogonal Frequency Division Multiplex Access (OFDMA) protocols, or any other WWAN protocol now known or later developed. Mobile node 102 may instead or in addition communicate with radio transceivers 104 and 108 using a protocol such as Institute of Electrical and Electronics Engineers (IEEE) 802.11 or 802.16, Bluetooth, HiperLAN, Multichannel Multipoint Distribution Service (MDS), HomeRF, or any other WLAN protocol now known or later developed.

Radio transceivers 104 and 108 may be any devices capable of providing a wireless packet-data connection to mobile node 102, providing a wired or wireless packet-data connection to mobility agents 106 and 110, respectively, passing packet-data communication between mobile node 102 and mobility agents 106 and 110, respectively, and of carrying out the functions described herein. One or both of radio transceivers 104 and 108 may communicate with mobile node 102 using any of the protocols mentioned in the preceding paragraph, or using some other wireless protocol now known or later developed.

Radio transceivers 104 and 108 may take on various forms, such as a combination of a base transceiver station and base station controller, as is known in the art of WWANs. Another example could be a wireless access point, perhaps along with a network access device, as is known in the art of WLANs. Whether either or both of radio transceivers 104 and 108 take one of these forms or some other form, each will send data to and receive data from mobile node 102 over a wireless air interface. Each of the radio transceivers 104 and 108 will thus be equipped to send and receive radio signals in their respective coverage areas 116 and 118.

Mobility agents 106 and 110 may be communicatively connected to radio transceivers 104 and 108, respectively, as well as to PDN 112. Thus, mobility agents 106 and 110 may be any devices arranged to pass packet-data communications between (i) their respective radio transceivers 104 and 108 and (ii) PDN 112, and to carry out the mobility functions and other functions described herein. With respect to mobility functions, either or both of mobility agents 106 and 110 may implement Simple IP, or may function as a Mobile IP home agent or foreign agent with respect to mobile node 102. Furthermore, either or both of mobility agents 106 and 110 may implement version 4 or 6 of IP and/or Mobile IP.

As examples, either or both of mobility agents 106 and 110 may be or include one or more of the following known networking devices: a packet data serving node, a network access server, an access server, a network access controller, an access controller, a network access device, an interworking function, a gateway, a server, a router, and/or a bridge. Mobility agents 106 and 110 may send out agent advertisements and/or respond to solicitations to aid mobile nodes in establishing connections with them.

If one of the mobility agents 106 or 110 functions as a home agent for mobile node 102, that mobility agent may reside on a network that is mobile node 102's home network and may route packets to mobile node 102's home address when mobile node 102 is attached to that home network. When mobile node 102 is connected to a foreign agent, the home agent may (i) receive registration requests from mobile node 102, (ii) send registration replies to mobile node 102, (iii) maintain mobility bindings associating mobile node 102's home address and current care-of address, (iv) assign a home address to mobile node 102, (v) tunnel data addressed to mobile node 102's home address to mobile node 102's care-of address, and/or perform one or more additional functions to facilitate mobile node 102's mobility.

If one or both of mobility agents 106 or 110 function as a foreign agent with respect to mobile node 102, that mobility agent may reside on mobile node 102's home network or another network. When mobile node 102 is using either mobility agent 106 or mobility agent 110 as a foreign agent, that mobility agent may: (i) forward registration requests from mobile node 102 to mobile node 102's home agent, (ii) forward registration replies from mobile node 102's home agent to mobile node 102, (iii) maintain a visitor-list entry associating mobile node 102's home address with a particular link-layer connection between the mobility agent and mobile node 102, (iv) route outgoing packets from mobile node 102 to either the home agent or to another node, (v) forward incoming packets addressed to mobile node 102's home address to mobile node 102, and/or perform one or more additional functions to facilitate mobile node 102's mobility.

PDN 112 may be communicatively coupled with at least mobility agents 106 and 110, and perhaps with one or more packet-switched or circuit-switched networks. PDN 112 may include one or more wide area networks, one or more local area networks, one or more public networks such as the Internet, one or more private networks, one or more wired networks, and/or one or more wireless networks. Devices in communication with PDN 112 may exchange data using a packet-switched protocol such as IP, and may be identified by a network address such as an IP address.

b. Exemplary Mobile Node

Figure 2:
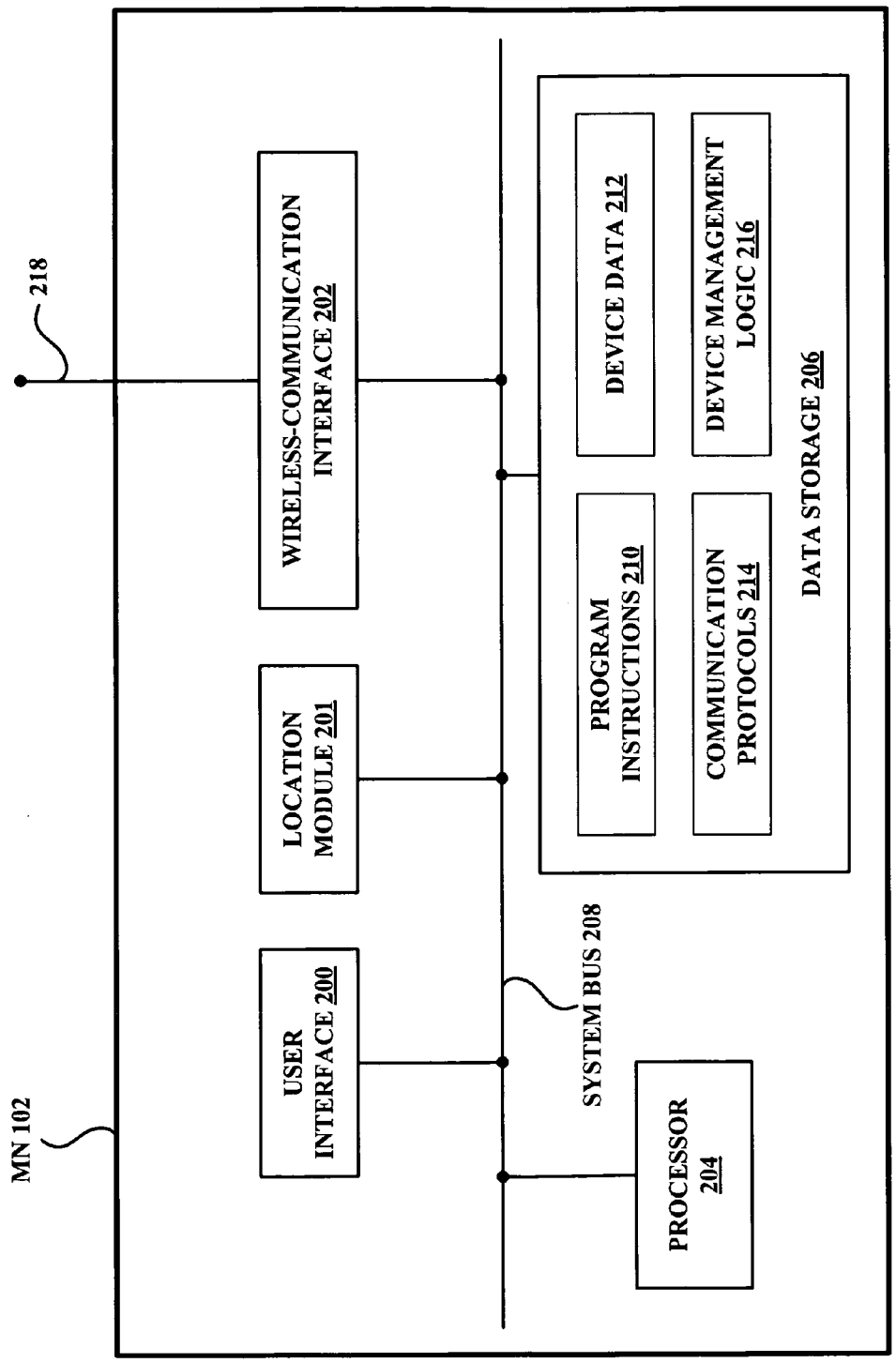
FIG. 2 is a simplified block diagram of a mobile node, in accordance with an exemplary embodiment.

FIG. 2 is a simplified block diagram of a mobile node, in accordance with an exemplary embodiment. In particular, FIG. 2 depicts mobile node 102 of FIG. 1. As shown in FIG. 2, mobile node 102 includes a user interface 200, a location module 201, a wireless-communication interface 202, a processor 204, and data storage 206, all of which may be communicatively linked by a system bus 208. In general, mobile node 102 may be any device, such as a cellular telephone or some other device, arranged to carry out the functions described herein.

User interface 200 includes one or more mechanisms for receiving inputs from users, and one or more mechanisms for communicating outputs to users. Cell phone user interfaces are known in the art, and thus are not described in detail here. Suffice it to say that user interface 200 may include buttons, a touch screen, a microphone, and any other mechanisms now known or later developed for receiving inputs, as well as an LCD or other display, speakers, and any other mechanisms now known or later developed for communicating outputs.

Location module 201 may include any combination of hardware, software, and/or firmware necessary for mobile node 102 to obtain measurements of its position. As examples, location module 201 could include a GPS receiver and/or a Wide Area Augmentation System (WAAS) receiver, which is a device sometimes used in conjunction with a GPS receiver to enhance the accuracy of the positioning technology. Location module 201 may use information received by the GPS receiver from a WAAS to further enhance location accuracy.

Location module 201 could communicate with Position Determination Equipment (PDE), perhaps via PDN 112. Location module 201 and/or the PDE could use now known or later developed methods to determine position. One such method is known as position triangulation, in which measurements are taken as to the times it takes for wireless signals to reach a mobile node from different radio transceivers, such as are found in WWAN base stations. This data can then be used to calculate the latitude and longitude of the mobile node. As another possibility, location module 201 could include measurements of mobile node 102's altitude as well, as well as any other measurements of any other position-related metric.

Processor 204 may interface with location module 201 to make requests that location module 201 obtain position measurements, and location module 201 may respond by transmitting the measurements to processor 204, or to data storage 208. Alternatively, location module 201 may periodically or in response to some other trigger obtain one or more position measurements without being requested to do so by processor 204. And any combination of these approaches could be used as well.

Wireless-communication interface 202 may include a chipset arranged to communicate over an air interface with one or more radio transceivers, such as radio transceivers 104 and 108, according to a protocol such as CDMA, IEEE 802.11, any of the other wireless-communication protocols mentioned herein, or any other protocol. This chipset may interface with an antenna 218 to facilitate communication with the radio transceivers. Wireless-communication interface 202 may be capable of communicating with both WWANs and WLANs, in that interface 202 may be a single chipset capable of both, or it may be a combination of a WWAN-communication interface and a WLAN-communication interface, which may or may not share a common antenna such as antenna 218. Other examples are possible as well.

Processor 204 may control many operations of mobile node 102 by executing a set of program instructions 210 stored in data storage 206, and may comprise multiple (e.g., parallel) processors, such as a general purpose microprocessor and/or a discrete digital signal processor. Data storage 206 may take various forms, in one or more parts, such as a non-volatile storage block and/or a removable storage medium. Data storage 206 may store program instructions 210, device data 212, communication protocols 214, and device management logic 216.

Program instructions 210 may be executable by processor 204 to carry out various functions described herein. Device data 214 may store, among other data, multiple measurements of mobile node 102's position. As examples, device data 214 may include at least a most-recently-measured position and a previously-measured position; these two values may be compared by processor 204 to determine whether or not mobile node 102 is traveling. Device data 214 may also store several recent measurements of signal strength from one or more radio transceivers, such as radio transceivers 104 and 108.

Device data 214 may also store threshold values for (i) the distance between position measurements that is designated as sufficient to consider mobile node 102 to be traveling; (ii) the level of signal strength that is designated as sufficient for mobile node 102 to engage in packet-data communication (i.e., the level of signal strength above which mobile node 102 may arbitrate between two or more signals based on whether or not mobile node 102 is traveling); and (iii) the difference in level of signal strength from a particular radio transceiver that mobile node 102 may consider sufficient to indicate that it is traveling from one coverage area to another, when considered in conjunction with traveling the previously-mentioned threshold distance.

Communication protocols 214 may be useful to receive data from and send data to radio transceivers 104 and 108, and beyond, and may include any of the protocols mentioned herein, one or more proprietary protocols, and/or one or more other protocols now known or later developed. Compatible protocols may be stored in other entities in communication with mobile node 102. Device management logic 216 may be used to manage aspects of mobile node 102 such as memory and file management.

3. Exemplary Operation

Figure 3:
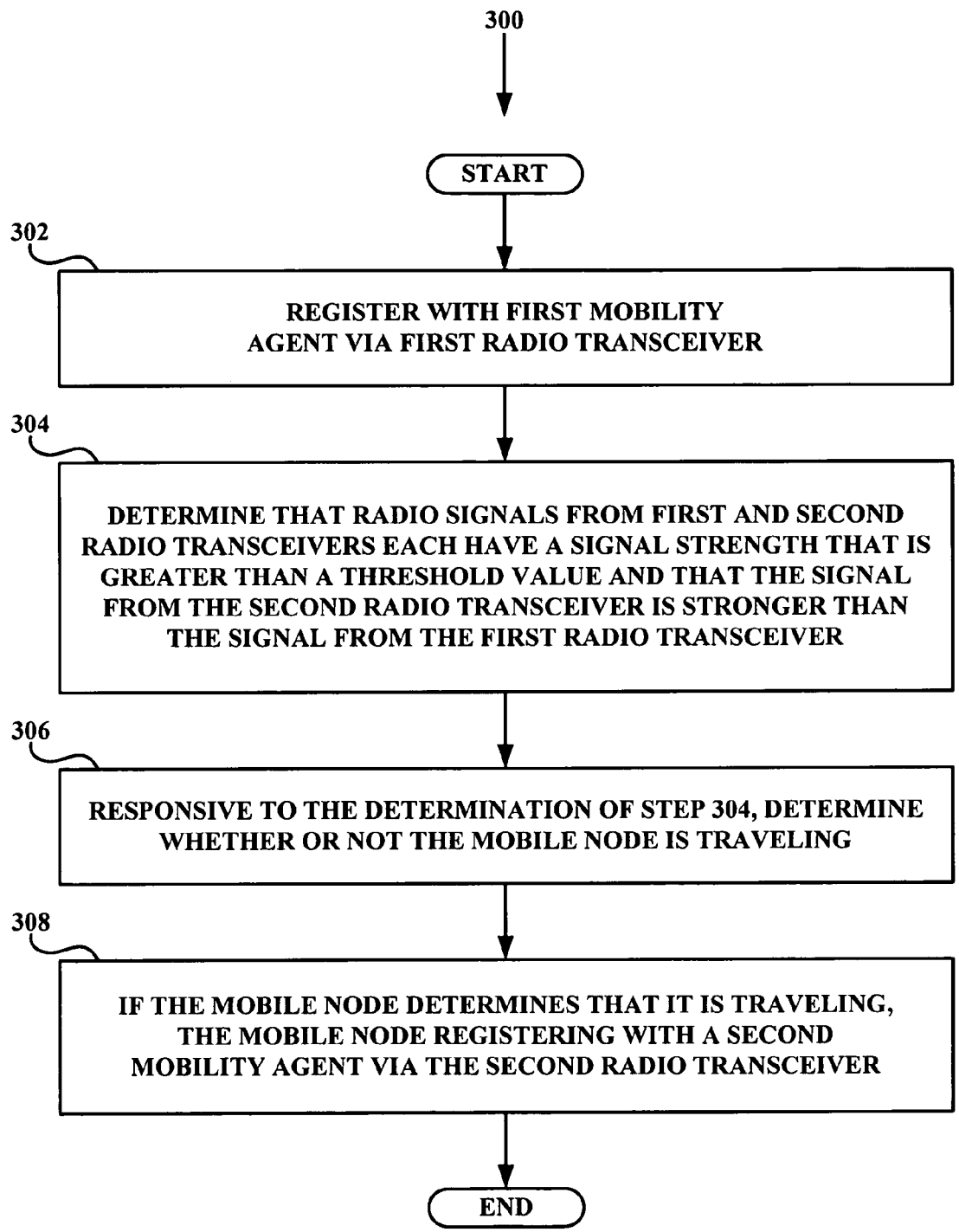
FIG. 3 is a flowchart of a method that makes use of the communication system of FIG. 1, in accordance with an exemplary embodiment.

FIG. 3 is a flowchart of a method that makes use of the communication system of FIG. 1, in accordance with an exemplary embodiment. As shown in FIG. 3, the method 300 begins at step 302, when mobile node 102 registers with mobility agent 106 via radio transceiver 104. If mobility agent 106 implements Simple IP, or is mobile node 102's home agent, then step 302 may simply take the form of mobile node 102 connecting to the network on which mobility agent 106 resides. In the case of mobility agent 106 being mobile node 102's home agent, this network would be mobile node 102's home network. Mobile node 102 may then acquire a first IP address from or via mobility agent 106. If mobile node 102 had been registered with any other mobility agents, mobile node 102 may de-register with those agents.

If mobility agent 106 is a foreign agent with respect to mobile node 102, step 302 may take the form of mobile node 102 sending a registration request to mobility agent 106, which would then forward that request to mobile node 102's home agent. Upon receipt of a registration reply, approving the request, from the home agent, mobility agent 106 would forward that reply to mobile node 102 and store a visitor-list entry associating mobile node 102's home address with a link-layer connection between mobility agent 106 and mobile node 102. The home agent would store a mobility binding associating mobile node 102's home address with mobility agent 106's IP address. The home agent would then tunnel any IP traffic addressed to mobile node 102's home address to mobility agent 106, for delivery to mobile node 102.

In the cases where mobility agent 106 is a home agent or foreign agent with respect to mobile node 102, step 302 will have the effect that any IP traffic sent to mobile node 102's home address from other nodes in communication with PDN 112 will be routed to mobile node 102. And whether mobility agent 106 implements Simple IP or Mobile IP, after step 302, mobile node 102 can engage in packet-data communication sessions such as web browsing sessions, streaming media sessions, VoIP sessions, and other types of communication sessions.

At step 304, mobile node 102 has moved into an area of overlap between (i) the coverage area 116 of radio transceiver 104, which is associated with mobility agent 106, and (ii) the coverage area 118 of radio transceiver 108, which is associated with mobility agent 110. Mobile node 102 thus determines that it is receiving a first radio signal from transceiver 104 and a second radio signal from transceiver 108. Mobile node 102 further determines that both of those radio signals have a signal strength that is greater than a particular threshold value that has been programmed into mobile node 102. This may indicate to mobile node 102 that each signal is strong enough to support packet-data communication. Mobile node 102 further determines that the second signal (from transceiver 108) is stronger than the first signal (from transceiver 104).

At step 306, responsive to the determination made in step 304, mobile node 102 makes a determination as to whether or not it is traveling. Mobile node 102 may carry out step 306 by comparing its current (or most-recently-measured) position with a previous position. More specifically, mobile node 102 may determine that it is traveling if the distance between those two measurements is greater than a threshold distance programmed into mobile node 102. As noted above, this threshold distance could be, as examples, 250 feet or 500 feet.

This threshold distance may be substantially equal to the amount of overlap 114 between coverage areas 116 and 118 of transceivers 104 and 108, respectively. The approximate amount of overlap 114 between coverage areas 116 and 118 may be chosen as a threshold distance in making the determination as to whether mobile node 102 is traveling because, if mobile node 102 has traveled that distance between the two position measurements being compared, that may indicate that mobile node 102 is traveling enough to be passing between coverage areas.

The previous position, which mobile node 102 compares with its current position, could be the second-most-recent position measured by mobile node 102. For example, mobile node 102 may be arranged to record a position at regular time intervals, such as every 10, 30, or 60 seconds, as examples. Mobile node 102 may further be arranged to store the two most-recently-taken position measurements, for use in determining whether or not mobile node 102 is traveling.

As another possibility, the previous position that mobile node 102 compares with its current position could be a first position recorded by mobile node 102 after determining that the signals from transceivers 104 and 108 were each greater than a threshold value and that the signal from transceiver 108 was the stronger of the two. Mobile node 102 may, upon making this determination, store an initial position. Mobile node 102 may then periodically compare that initial position with its current position, to determine whether or not it has moved a particular threshold distance from that initial position, or conversely whether it is still within a particular radius of that initial position. Other possibilities exist as well with respect to the choice of position measurements that mobile node 102 compares to determine whether it is traveling.

With respect to how mobile node 102 obtains the position values necessary to make the above-described comparisons, multiple possibilities exist. One option would be for mobile node 102 to use GPS. The practice of mobile nodes using GPS to determine their position is known in the art, and thus is not described in detail. In addition, mobile node 102 could use one of multiple known methods of enhancing the accuracy of GPS readings, such as Assisted GPS (A-GPS), Differential GPS (DGPS), and Wide Area Augmentation System (WAAS). In general, these methods of enhancing GPS make use of both a GPS receiver in the mobile device and at least one other GPS receiver at a known location. In addition to these examples, a mobile node may use triangulation, or any positioning technology now known or later developed.

Mobile node 102 may also include another component in its decision as to whether it is traveling. In some embodiments, mobile node 102 may compare a recent measurement with an earlier measurement of signal strength from radio transceiver 104 or 108. Mobile node 102 may do so to address a situation where mobile node 102 determines that it has moved a threshold distance but has not detected a noticeable change in the signal strength from either transceiver 104 or 108. This could occur if, for example, mobile node 102 took first position and signal-strength measurements at point 120 on FIG. 1 and second such measurements at point 122.

In that scenario, the signal strengths from transceivers 104 and 108 may be quite similar at points 120 and 122. As such, mobile node 102 may decide for the purposes of this invention that it is not traveling. One way in which mobile node 102 may include this consideration of signal strength is to store a first signal-strength measurement—for the signal received from transceiver 104—at approximately the time that mobile node 102 stores an initial position.

Mobile node 102 may later store a current or most-recent signal-strength measurement—again for the signal received from transceiver 104—at approximately the time that mobile node 102 stores a current or most-recent position. Mobile node 102 may then determine whether the signal strength from transceiver 104 has decreased enough to indicate that the threshold distance that mobile node has moved is in a direction sufficiently away from transceiver 104. If so, and in combination with the determination made with respect to positioning information, mobile node 102 may determine that it is traveling.

Another possibility is to carry out a similar process with respect to transceiver 108. That is, mobile node 102 may take signal-strength measurements at times similar to those described in the preceding paragraph, though this time with respect to the signal received from transceiver 108. Mobile node 102 may then determine whether the signal strength from transceiver 108 has increased enough to indicate that the threshold distance that mobile node 102 has moved is in a direction sufficiently towards transceiver 108. If so, and in combination with the determination made with respect to positioning information, mobile node 102 may determine that it is traveling.

At step 308, if mobile node 102 determines, in step 306, that it is traveling, mobile node 102 registers with mobility agent 110 via radio transceiver 108. The registration of step 308 may take a form substantially similar to that described above with respect to step 302, differing in form depending on whether mobility agent 110 implements Simple IP, or is a home agent or foreign agent with respect to mobile node 102. Either way, IP traffic addressed to an IP address obtained by mobile node 102 from mobility agent 110—or to mobile node 102's home address—will thereafter be routed to mobile node 102 via mobility agent 110.

Note that mobile node 102 carries out step 308 based on the assumption that it is traveling from the coverage area 116 of transceiver 104 to the coverage area 118 of transceiver 108, and is only temporarily in an area of overlap between the two coverage areas. Since mobile node 102 determined, in step 306, that it was traveling, mobile node 102 registers with mobility agent 110 based on the conclusion that, most likely, mobile node 102 will be moving out of the coverage area of transceiver 104 and into an area covered only by transceiver 108. To facilitate the carrying out of step 308, mobile node 102 may detect agent advertisements from mobility agent 110, and/or send solicitations to aid in locating and connecting to mobility agent 110.

If mobile node 102 were to determine, in step 306, that it is not traveling, mobile node 102 would not register with mobility agent 110. Rather, mobile node 102 would be programmed to simply maintain the packet-data connectivity that it has by virtue of being registered with mobility agent 106 via transceiver 104. Mobile node 102 would be programmed to conclude that, if it is not traveling from one coverage area to the next, it would be wasteful to incur the costs associated with a re-registration, in light of the fact that transceiver 104 is providing a radio signal that is strong enough to support packet-data communication.

4. Conclusion

Various exemplary embodiments have been described above. Those skilled in the art will understand, however, that changes and modifications may be made to those examples without departing from the scope of the claims. For example, the exemplary embodiments have been described with respect to the Simple and Mobile IP protocols. However, other protocols now known or later developed could be chosen for implementation.

What is claimed is:

1. A method comprising:
   a mobile node registering with a first mobility agent, wherein the mobile node communicates with the first mobility agent via a first radio transceiver;
   the mobile node determining that a first signal strength of a first radio signal from the first radio transceiver and a second signal strength of a second radio signal from a second radio transceiver are each greater than a first threshold and that the second signal strength is greater than the first signal strength;
   responsive to determining that the first and second signal strengths are each greater than the first threshold and that the second signal strength is greater than the first signal strength, the mobile node determining whether or not it is traveling; and
   if the mobile node determines that it is traveling, the mobile node registering with a second mobility agent, wherein the mobile node communicates with the second mobility agent via the second radio transceiver.

2. The method of claim 1, wherein the mobile node comprises at least one device selected from the group consisting of a cellular telephone, a voice-over-packet telephone, a laptop computer, a personal digital assistant, and a multi-mode device.

3. The method of claim 1, wherein at least one of the first and second mobility agents implements at least one protocol selected from the group consisting of Internet Protocol (IP), Simple IP, IP version 4 (IPv4), IP version 6 (IPv6), Mobile IP, Mobile IPv4, and Mobile IPv6.

4. The method of claim 1, wherein at least one of the first and second mobility agents comprises at least one mobility agent selected from the group consisting of a home agent, a foreign agent, a packet data serving node, a network access server, an access server, a network access controller, an access controller, a network access device, an interworking function, a gateway, a server, a router, and a bridge.

5. The method of claim 1, wherein the mobile node communicates with at least one of the first and second radio transceivers using at least one protocol selected from the group consisting of Code Division Multiple Access, Time Division Multiple Access, Orthogonal Frequency Division Multiple Access, IEEE 802.11, IEEE 802.16, Bluetooth, HiperLAN, Multichannel Multipoint Distribution Service, and HomeRF.

6. The method of claim 1, wherein the mobile node determining whether or not it is traveling comprises the mobile node determining whether or not a distance between a most-recent position and a previous position is greater than a second threshold.

7. The method of claim 6, wherein the previous position corresponds to a second-most-recent position.

8. The method of claim 6, wherein the previous position corresponds to a first position recorded after the mobile node determines that the first and second signal strengths are each greater than the first threshold and that the second signal strength is greater than the first signal strength.

9. The method of claim 6, wherein at least one of the most-recent position and the previous position is measured using at least one method selected from the group consisting of Global Positioning System (GPS), Assisted GPS (A-GPS), Differential GPS (DGPS), Wide Area Augmentation System (WAAS), and triangulation.

10. The method of claim 6, wherein the mobile node determining whether or not it is traveling further comprises the mobile node determining whether or not a difference between a most-recent signal strength of the first radio signal and a previous signal strength of the first radio signal is greater than a third threshold and that the previous signal strength of the first radio signal is greater than the most-recent signal strength of the first radio signal.

11. The method of claim 6, wherein the mobile node determining whether or not it is traveling further comprises the mobile node determining whether or not a difference between a most-recent signal strength of the second radio signal and a previous signal strength of the second radio signal is greater than a third threshold and that the most-recent signal strength of the second radio signal is greater than the previous signal strength of the second radio signal.

12. The method of claim 1, wherein if the mobile node determines that it is not traveling, the mobile node not registering with the second mobility agent.

13. A mobile node comprising:
   a wireless-communication interface;
   a location module;

a processor; and data storage having stored therein instructions executable by the processor to:

register with a first mobility agent, wherein the mobile node uses the wireless-communication interface to communicate with the first mobility agent via a first radio transceiver;

determine that a first signal strength of a first radio signal from the first radio transceiver and a second signal strength of a second radio signal from a second radio transceiver are each greater than a first threshold and that the second signal strength is greater than the first signal strength;

responsive to determining that the first and second signal strengths are each greater than the first threshold and that the second signal strength is greater than the first signal strength, determine whether or not the mobile node is traveling; and if the mobile node determines that it is traveling, register with a second mobility agent, wherein the mobile node uses the wireless-communication interface to communicate with the second mobility agent via the second radio transceiver.

14. The mobile node of claim 13, wherein the mobile node comprises at least one device selected from the group consisting of a cellular telephone, a voice-over-packet telephone, a laptop computer, a personal digital assistant, and a multi-mode device.

15. The mobile node of claim 13, wherein at least one of the first and second mobility agents comprises at least one mobility agent selected from the group consisting of a home agent, a foreign agent, a packet data serving node, a network access server, an access server, a network access controller, an access controller, a network access device, an interworking function, a gateway, a server, a router, and a bridge.

16. The mobile node of claim 13, wherein the mobile node communicates with at least one of the first and second radio transceivers using at least one protocol selected from the group consisting of Code Division Multiple Access, Time Division Multiple Access, Orthogonal Frequency Division Multiple Access, IEEE 802.11, IEEE 802.16, Bluetooth, HiperLAN, Multichannel Multipoint Distribution Service, and HomeRF.

17. The mobile node of claim 13, wherein the instructions to determine whether or not the mobile node is traveling comprise instructions to determine whether or not a distance between a most-recent position and a previous position is greater than a second threshold.

18. The mobile node of claim 17, wherein the previous position corresponds to a second-most-recent position.

19. The mobile node of claim 17, wherein the previous position corresponds to a first position recorded after the mobile node determines that the first and second signal strengths are each greater than the first threshold and that the second signal strength is greater than the first signal strength.

20. The mobile node of claim 17, wherein the mobile node measures at least one of the most-recent position and the previous position using at least one method selected from the group consisting of Global Positioning System (GPS), Assisted GPS (A-GPS), Differential GPS (DGPS), Wide Area Augmentation System (WAAS), and triangulation.

* * * * *

UNITED STATES PATENT AND TRADEMARK OFFICE
CERTIFICATE OF CORRECTION

| | | |
|---|---|---|
| PATENT NO. | : 7,633,915 B1 | Page 1 of 1 |
| APPLICATION NO. | : 11/224527 | |
| DATED | : December 15, 2009 | |
| INVENTOR(S) | : Ronald E. Lewis | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 727 days.

Signed and Sealed this

Ninth Day of November, 2010

David J. Kappos
*Director of the United States Patent and Trademark Office*